(12) United States Patent
Romig et al.

(10) Patent No.: US 9,140,189 B2
(45) Date of Patent: Sep. 22, 2015

(54) SYSTEMS AND METHODS FOR DETECTING FUEL LEAKS IN GAS TURBINE ENGINES

(75) Inventors: Bryan Wesley Romig, Greenville, SC (US); Derrick Simons, Greenville, SC (US); Douglas Dean, Greenville, SC (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 13/444,375

(22) Filed: Apr. 11, 2012

(65) Prior Publication Data

US 2013/0269364 A1 Oct. 17, 2013

(51) Int. Cl.
| | | |
|---|---|---|
| F02C 9/26 | (2006.01) | |
| F02C 7/232 | (2006.01) | |
| F02C 9/28 | (2006.01) | |
| F02C 7/22 | (2006.01) | |
| F02D 41/22 | (2006.01) | |
| F01D 21/14 | (2006.01) | |

(52) U.S. Cl.
CPC . *F02C 7/232* (2013.01); *F02C 7/22* (2013.01); *F02C 9/28* (2013.01); *F01D 21/14* (2013.01); *F02D 2041/225* (2013.01); *F05D 2260/80* (2013.01)

(58) Field of Classification Search
CPC .............. F02C 7/22; F02C 9/28; F02C 9/26; F02D 2041/225; F02D 41/22; F23N 2031/18
USPC ................. 60/733, 734, 739, 740, 742, 779; 73/112.01, 114.43
See application file for complete search history.

(56) References Cited

U.S. PATENT DOCUMENTS

| | | | |
|---|---|---|---|
| 4,716,719 A * | 1/1988 | Takahashi et al. | 60/773 |
| 6,082,095 A * | 7/2000 | Akimaru | 60/39.465 |
| 6,438,963 B1 * | 8/2002 | Traver et al. | 60/779 |
| 7,127,347 B2 | 10/2006 | Moser et al. | |
| 7,360,408 B2 * | 4/2008 | Dingler et al. | 73/118.01 |
| 2007/0193340 A1 * | 8/2007 | Yoshida | 73/46 |
| 2009/0241510 A1 * | 10/2009 | Gallagher et al. | 60/39.281 |

* cited by examiner

*Primary Examiner* — Steven Sutherland
(74) *Attorney, Agent, or Firm* — Sutherland Asbill & Brennan LLP

(57) ABSTRACT

Embodiments can provide systems and methods for detecting fuel leaks in gas turbine engines. According to one embodiment, there is disclosed a method for detecting a fuel leak in a gas turbine engine. The method may include adjusting a control valve to correspond with a desired fuel flow. The method may also include determining an actual fuel flow based at least in part on an upstream pressure in a fuel manifold and one or more gas turbine engine parameters. The method may also include comparing the desired fuel flow with the actual fuel flow. Moreover, the method may include determining a difference between the desired fuel flow and the actual fuel flow, wherein the difference indicates a fuel leak.

16 Claims, 3 Drawing Sheets

SYSTEMS AND METHODS FOR DETECTING FUEL LEAKS IN GAS TURBINE ENGINES

FIELD OF THE DISCLOSURE

Embodiments relate generally to gas turbine engines, and more particularly to systems and methods for detecting fuel leaks in gas turbine engines.

BACKGROUND OF THE DISCLOSURE

In gas turbine engines, if internal manifolds or passages develop a leak, it is desirable that the leak is detected quickly and action is taken prior to an ignition of the fuel/air mixture. Fuel circuits, such as quat or late lean injection, show the most risk for such leaks because they introduce fuel well upstream of the combustion process; however, other leakage locations are possible where fuel nozzles join to other pieces of hardware.

BRIEF DESCRIPTION OF THE DISCLOSURE

Some or all of the above needs and/or problems may be addressed by certain embodiments of the disclosure. Disclosed embodiments may include systems and methods for detecting fuel leaks in gas turbine engines. According to one embodiment, there is disclosed a method for detecting a fuel leak in a gas turbine engine. The method may include adjusting a control valve to correspond with a desired fuel flow. The method may also include determining an actual fuel flow based at least in part on an upstream pressure in a fuel manifold and one or more gas turbine engine parameters. The method may also include comparing the desired fuel flow with the actual fuel flow. Moreover, the method may include determining a difference between the desired fuel flow and the actual fuel flow, wherein the difference indicates a fuel leak.

According to another embodiment, there is disclosed a system for detecting a fuel leak in a gas turbine engine. The system may include a control valve and a controller. The controller may include at least one memory that stores computer-executable instructions and at least one processor configured to access the at least one memory. The at least one processor may be configured to execute the computer-executable instructions to: adjust a control valve to correspond with a desired fuel flow; determine an actual fuel flow based at least in part on an upstream pressure in a fuel manifold and one or more gas turbine engine parameters; compare the desired fuel flow with the actual fuel flow; and determine a difference between the desired fuel flow and the actual fuel flow, wherein the difference indicates a fuel leak.

Further, according to another embodiment, there is disclosed a method for detecting a fluid leak in a gas turbine engine. The method may include adjusting a control valve to correspond with a desired fluid flow. The method may also include determining an actual fluid flow based at least in part on an upstream pressure in a fluid manifold and one or more gas turbine engine parameters. The method may also include comparing the desired fluid flow with the actual fluid flow. Moreover, the method may include determining a difference between the desired fluid flow and the actual fluid flow, wherein the difference indicates a fluid leak. Based at least in part on the difference, the method may include initiating at least one corrective action to mitigate a risk associated with the fluid leak.

Other embodiments, aspects, and features will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE DISCLOSURE

Figure 1:
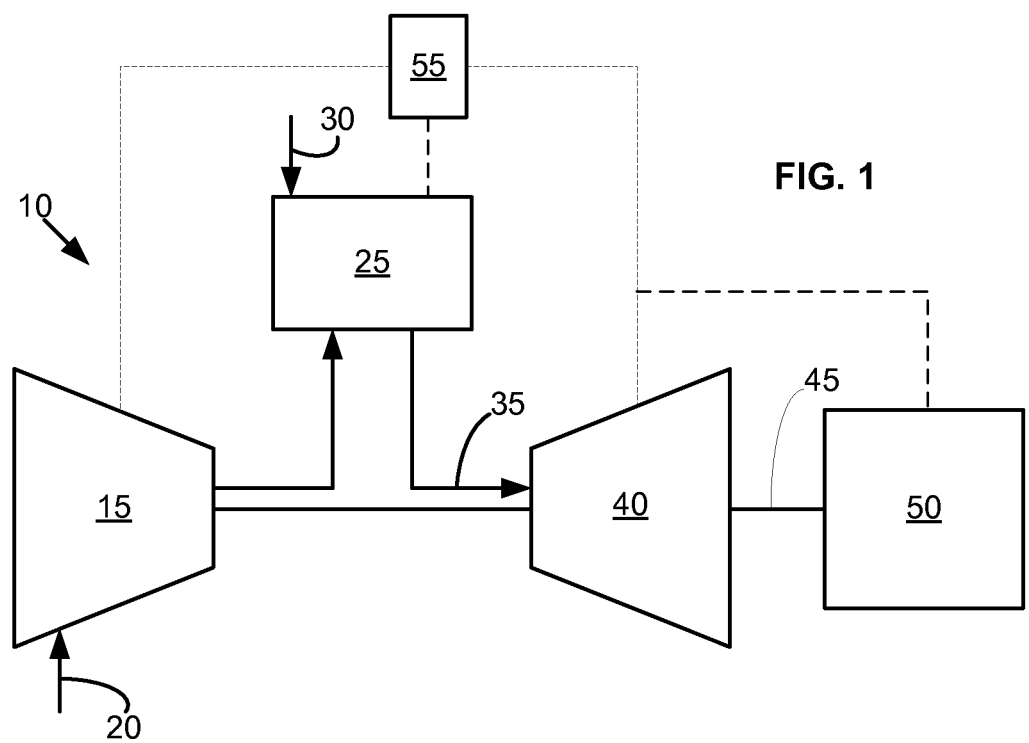
FIG. 1 is a schematic of a gas turbine engine, according to an embodiment.

Illustrative embodiments will now be described more fully hereinafter with reference to the accompanying drawings, in which some, but not all embodiments are shown. The systems and methods may be embodied in many different forms and should not be construed as limited to the embodiments set forth herein; rather, these embodiments are provided so that this disclosure will satisfy applicable legal requirements. Like numbers refer to like elements throughout.

Illustrative embodiments are directed to, among other things, systems and methods for detecting a fuel leak in a gas turbine engine. Certain embodiments may be directed towards determining a difference between a desired fuel flow and an actual fuel flow, wherein the difference indicates a fuel leak. For example, a control valve may be adjusted to correspond with a desired fuel flow. Next, an actual fuel flow may be determined based at least in part on an upstream pressure in a fuel manifold and one or more gas turbine engine parameters. It should be noted that adjusting the control valve adjusts the actual fuel flow and the upstream pressure in the fuel manifold. The desired fuel flow may be compared with the actual fuel flow such that a difference between the desired fuel flow and the actual fuel flow may be determined. In this manner, the difference between the desired fuel flow and the actual fuel flow may indicate a fuel leak. For example, detecting a fuel leak may be based at least in part on a predefined deviation between the desired fuel flow and the actual fuel flow that is indicative of a fuel leak.

In some instances, based at least in part on the difference between the desired fuel flow and the actual fuel flow, at least one corrective action may be initiated to correct the fuel leak. The at least one corrective action may comprise modifying one or more fuel circuit splits, modifying one or more operation conditions, or shutting down one or more fuel circuits. For example, fuel may be redirected to the various circuits and/or completely cutoff.

In certain aspects, the one or more gas turbine engine parameters may comprise one or more known parameters and/or one or more calculated parameters. For example, the one or more known parameters may comprise known fuel composition or known fuel circuit effective area. Other known parameters may include inlet temperature, inlet pressure, inlet humidity, inlet air composition, fuel pressure, or the like. The one or more calculated parameters may comprise a calculated downstream pressure or a calculated fuel temperature. Other calculated parameters may include a calculated downstream fuel temperature.

Certain embodiments of the invention can provide a technical solution to detecting a fuel leak in a gas turbine engine. By detecting a leak and taking action against it, the opportunity for the leak to cause damage is drastically reduced, and the opportunity to correct the leak with minimal cost is increased. Without leak detection, fuel leaks may build, which eventually may create a flame-holding or flashback situation, where the air/fuel mixture ignites causing burning in areas of the combustor where burning is not desirable. Such undesirable conditions may lead to hardware damage and hot gas path parts damage. By detecting leaks early and taking action against them, the leakage location can be assessed, and hardware can be changed prior to any damage. As a result, outage and downtime may be shorter and less costly than if hardware fails due to undesirable burning caused by a leak.

In certain embodiments, pressure sensors may be located in a fuel manifold of a fuel circuit and provide an upstream pressure. From the upstream pressure, along with a downstream pressure, fuel temperature, and fuel circuit effective area, an actual fuel flow can be calculated. In this manner, a desired fuel flow may be commanded by a control system (e.g., a controller) such that a fuel control valve is adjusted to achieve the desired fuel flow. The pressure in the fuel manifold changes as the fuel control valve is adjusted to achieve the desired fuel flow. As noted above, the actual fuel flow can be back calculated based on knowing the fuel manifold pressure and the other gas turbine parameters. The desired fuel flow and the calculated (i.e., actual) fuel flow can then be compared to each other to determine a relative difference. The difference between the desired fuel flow and the actual fuel flow can be used to determine if a leak has developed in the fuel circuits. If a leak is detected, the fuel manifold pressure will deviate from the expected, causing the calculated fuel flow to be different than predicted. Thus the relative deviation between the command (i.e., desired fuel flow) and the calculation (i.e., actual fuel flow) will increase.

As noted, one or more of the parameters needed to calculate the actual flow are not parameters that are directly measured; instead, these parameters can be calculated (i.e., back calculated) based on many of the other gas turbine engine parameters that are measured. In some instances, the fuel temperature needs to be known, so any heat pickup or heat loss should be considered as well as how that fuel temperature changes with changing conditions.

FIG. 1 provides a schematic view of a gas turbine engine 10, according to an embodiment. As is known, the gas turbine engine 10 may include a compressor 15. The compressor 15 compresses an incoming flow of air 20 and delivers the compressed flow of air 20 to a combustor 25. The combustor 25 may include one or more fuel manifolds and one or more fuel circuits. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may have different configurations and may use other types of components. Moreover, other types of gas turbine engines also may be used herein. Multiple gas turbine engines, other types of turbines, and other types of power generation equipment also may be used herein together.

Still referring to FIG. 1, the compressor 15, the combustor 25, the turbine 40, and the external load may all be in communication with a controller 55. In this manner, the controller 55 may be configured to control, regulate, and/or monitor any number of components of the gas turbine engine 10. The controller 55 may further be in communication with any number of sensors or monitoring devices associated with the gas turbine engine 10 as a whole or its individual components. The controller 55 may be configured as any suitable computing device capable of implementing the disclosed features, and accompanying methods, such as, but not limited to, those described with reference to FIGS. 1-3. By way of example and not limitation, suitable controllers 55 may include personal computers (PCs), servers, server farms, data centers, or any other device capable of storing and executing all or part of the disclosed features.

Figure 2:
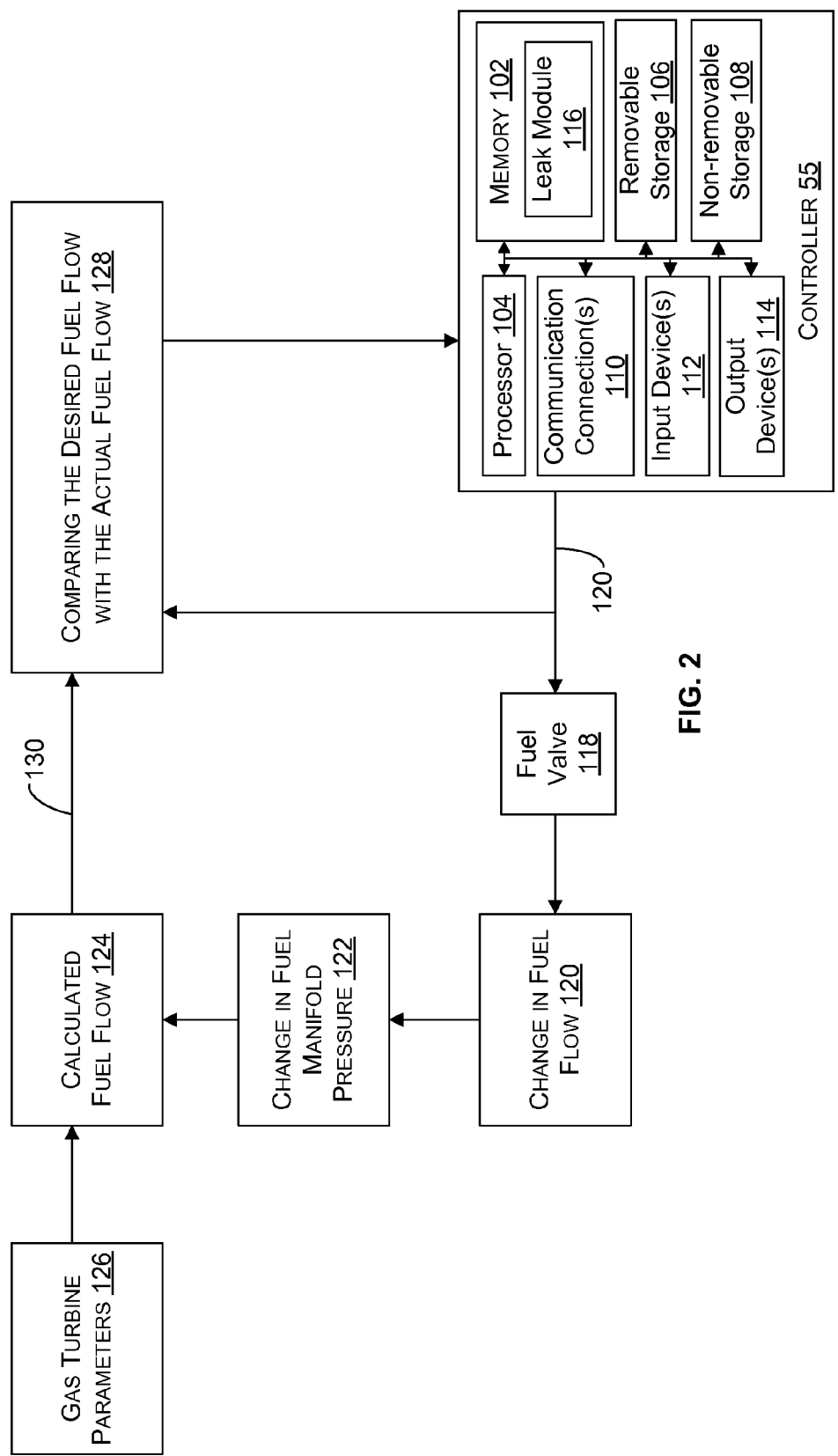
FIG. 2 is a block diagram illustrating details of an example data flow for detecting a fuel leak in a gas turbine engine, according to an embodiment.

In one illustrative configuration, as depicted in FIG. 2, the controller 55 comprises at least a memory 102 and one or more processing units (or processor(s)) 104. The processor(s) 104 may be implemented as appropriate in hardware, software, firmware, or combinations thereof. Software or firmware implementations of the processor(s) 104 may include computer-executable or machine-executable instructions written in any suitable programming language to perform the various functions described. Moreover, the processor(s) 104 may be associated with a network, a server, a computer or a mobile device.

Memory 102 may store program instructions that are loadable and executable on the processor(s) 104, as well as data generated during the execution of these programs. Depending on the configuration and type of the controller 55, memory 102 may be volatile (such as random access memory (RAM)) and/or non-volatile (such as read-only memory (ROM), flash memory, etc.). The computing device or server may also include additional removable storage 106 and/or non-removable storage 108 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 102 may include multiple different types of memory, such as static random access memory (SRAM), dynamic random access memory (DRAM), or ROM.

Memory 102, removable storage 106, and non-removable storage 108 are all examples of computer-readable storage media. For example, computer-readable storage media may include volatile and non-volatile, removable and non-removable media implemented in any method or technology for storage of information such as computer-readable instructions, data structures, program modules, or other data. Memory 102, removable storage 106, and non-removable storage 108 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tape, magnetic disk storage or other magnetic storage devices, or any other medium which can be used to store the desired information and which can be accessed by the server or other computing device. Combinations of any of above should also be included within the scope of computer-readable media.

Alternatively, computer-readable communication media may include computer-readable instructions, program modules, or other data transmitted within a data signal, such as a carrier wave, or other transmission.

The controller 55 may also contain communication connection(s) 110 that allow the controller 55 to communicate with a stored database, another computing device or server, user terminals, and/or other devices on a network. The controller 55 may also include input device(s) 112, such as a keyboard, mouse, pen, voice input device, touch input device, etc., and output device(s) 114, such as a display, speakers, printer, etc.

Turning to the contents of the memory 102 in more detail, the memory 102 may include an operating system and one or more application programs or services for implementing the features disclosed herein including a leak module 116. The leak module 116 may be configured to determine a difference between a desired fuel flow 120 and an actual fuel flow, wherein the difference indicates a fuel leak. For example, the controller 55 may determine a desired fuel flow 120. In this manner, a control valve 118 may be adjusted to correspond with the desired fuel flow 120. By adjusting the control valve 118, the actual fuel flow is adjusted, which in turn changes the fuel manifold pressure 122.

After the desired fuel flow 120 is determined and the fuel valve 118, fuel flow 120, and fuel manifold pressure 122 are adjusted accordingly, an actual fuel flow 130 may be determined at block 124. The actual fuel flow 130 may be determined at block 124 based at least in part on an upstream pressure in a fuel manifold 122 and one or more gas turbine engine parameters 126. In certain aspects, the one or more gas turbine engine parameters 126 may comprise one or more known parameters and/or one or more calculated parameters. For example, the one or more known parameters may comprise known fuel composition and/or known fuel circuit effective area. Using the upstream pressure in a fuel manifold 122 and other known parameters, the one or more calculated parameters may be determined. The one or more calculated parameters may include a calculated downstream pressure and/or a calculated fuel temperature. Any number of algorithms may be used to determine the calculated downstream pressure and/or the calculated fuel temperature.

Next, the desired fuel flow 120 may be compared with the actual fuel flow 130 such that a difference between the desired fuel flow and the actual fuel flow may be determined 128. In this manner, the difference between the desired fuel flow 120 and the actual fuel flow 130 may indicate a fuel leak in the fuel circuit. For example, detecting a fuel leak may be based at least in part on a predefined deviation between the desired fuel flow 120 and the actual fuel flow 130 that is indicative of a fuel leak in the fuel circuit.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example system shown in FIG. 2 is provided by way of example only. Numerous other operating environments, system architectures, and device configurations are possible. Accordingly, embodiments of the present disclosure should not be construed as being limited to any particular operating environment, system architecture, or device configuration.

Figure 3:
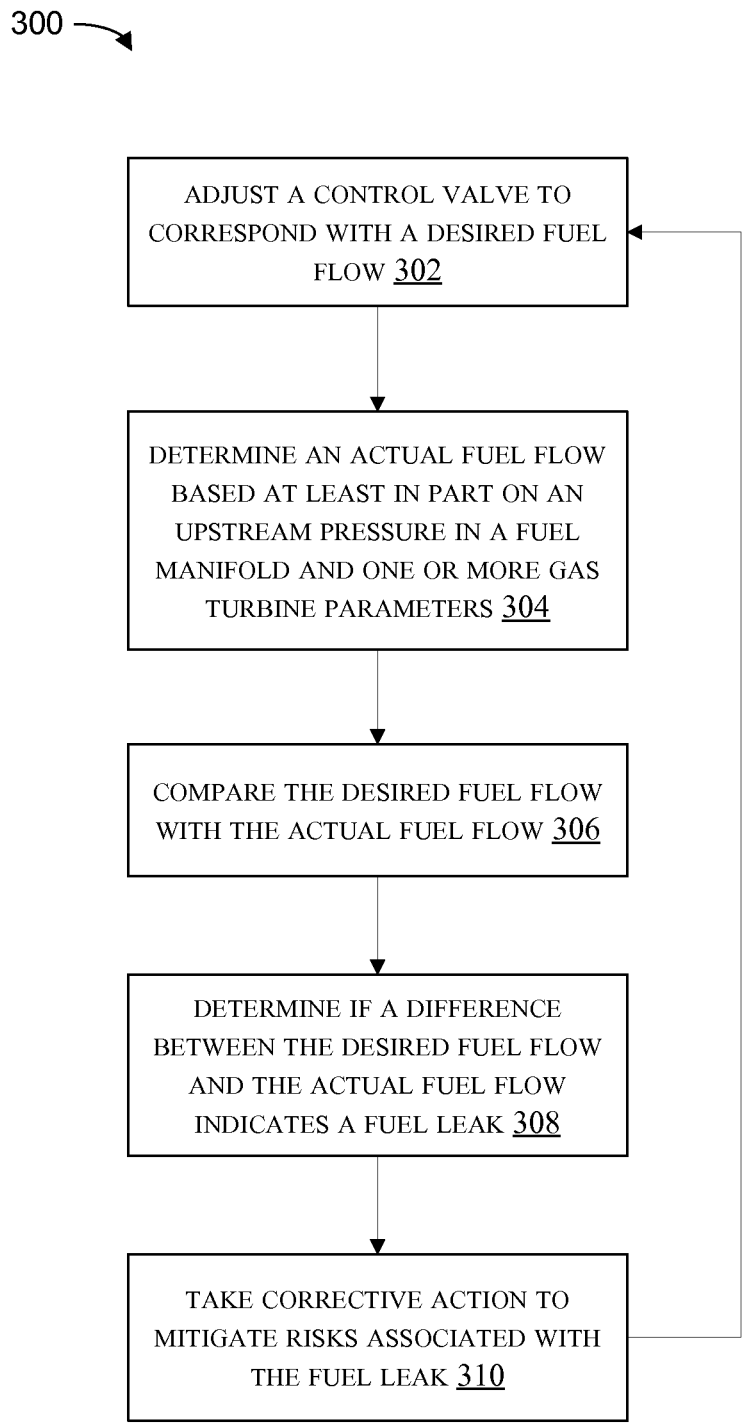
FIG. 3 is a flow diagram illustrating details of an example method for detecting a fuel leak in a gas turbine engine, according to an embodiment.

FIG. 3 illustrates an example flow diagram of a method 300 for implementing other aspects for detecting a fuel leak in a gas turbine engine, as discussed above. In one example, the illustrative controller 55 of FIGS. 1 and 2 and/or one or more modules of the illustrative controller 55, alone or in combination, may perform the described operations of the method 300.

In this particular implementation, the method 300 may begin at block 302 of FIG. 3 in which the method 300 can include adjusting a control valve to correspond with a desired fuel flow. By adjusting the control valve to correspond with a desired fuel flow, the actual fuel flow and fuel manifold pressure are adjusted. Further, at block 304, the method 300 can include determining an actual fuel flow based at least in part on an upstream pressure in a fuel manifold and one or more gas turbine engine parameters. In certain aspects, the one or more gas turbine engine parameters may comprise one or more known parameters and/or one or more calculated parameters. For example, the one or more known parameters may comprise known fuel composition and/or known fuel circuit effective area. Using the upstream pressure in a fuel manifold and other known parameters, the one or more calculated parameters may be determined. The one or more calculated parameters may include a calculated downstream pressure and/or a calculated fuel temperature. At block 306, the method 300 can include comparing the desired fuel flow with the actual fuel flow. At block 308, the method 300 may include determining a difference between the desired fuel flow and the actual fuel flow, wherein the difference indicates a fuel leak. For example, in some instances, the difference between the desired fuel flow and the actual fuel flow may be outside of a predefined deviation so as to indicate a fuel leak in the fuel circuit. Further, at block 310, the method 300 may include taking corrective action to mitigate risks associated with the fuel leak. For example, the at least one corrective action may comprise modifying one or more fuel circuit splits, modifying one or more operation conditions, or shutting down one or more fuel circuits.

Illustrative systems and methods are described for detecting fuel leaks in gas turbine engines. Some or all of these systems and methods may, but need not, be implemented at least partially by architectures such as those shown in FIGS. 1 and 2 above. Moreover, although embodiments have been described in relation to the detection of fuel leaks, it is understood that any fluid leak may be detected by the systems and methods described herein, including air, steam, water, air/fuel mixture, or the like.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method of detecting a fuel leak in a gas turbine engine, comprising:

positioning a pressure sensor in a fuel manifold;

adjusting a control valve to correspond with a desired fuel flow, wherein adjusting the control valve adjusts an actual fuel flow and a pressure in the fuel manifold downstream of the control valve;

determining the actual fuel flow downstream of the fuel manifold based at least in part on the pressure in the fuel manifold and one or more gas turbine engine parameters;

comparing the desired fuel flow with the actual fuel flow; and determining a difference between the desired fuel flow and the actual fuel flow, wherein the difference indicates a fuel leak.

2. The method of claim 1, further comprising based at least in part on the difference, initiating at least one corrective action.

3. The method of claim 2, wherein the at least one corrective action comprises at least one of: modifying one or more fuel circuit splits, modifying one or more operation conditions, or shutting down one or more fuel circuits.

4. The method of claim 1, wherein the one or more gas turbine engine parameters comprise at least one of: one or more known parameters or one or more calculated parameters.

5. The method of claim 4, wherein the one or more known parameters comprise at least one of: known fuel composition or known fuel circuit effective area.

6. The method of claim 4, wherein the one or more calculated parameters comprise at least one of: a calculated downstream pressure or a calculated fuel temperature.

7. The method of claim 1, wherein determining a difference between the desired fuel flow and the actual fuel flow is based at least in part on a predefined deviation.

8. A system for detecting fuel leaks in a gas turbine engine, comprising:
a control valve disposed upstream of a fuel manifold;
a pressure sensor positioned within the fuel manifold; and
a controller comprising:
at least one memory that stores computer-executable instructions;
at least one processor configured to access the at least one memory, wherein the at least one processor is configured to execute the computer-executable instructions to:
adjust the control valve to correspond with a desired fuel flow, which in turn adjusts an actual fuel flow and a pressure in the fuel manifold downstream of the control valve;
determine the actual fuel flow downstream of the fuel manifold based at least in part on the pressure in the fuel manifold and one or more gas turbine engine parameters;
compare the desired fuel flow with the actual fuel flow; and
determine a difference between the desired fuel flow and the actual fuel flow, wherein the difference indicates a fuel leak.

9. The system of claim 8, wherein the at least one processor is further configured to execute the computer-executable instructions to initiate at least one corrective action.

10. The system of claim 9, wherein the corrective action comprises at least one of: modifying one or more fuel circuit splits, modifying one or more operation conditions, or shutting down one or more fuel circuits.

11. The system of claim 8, wherein the one or more gas turbine engine parameters comprise at least one of: one or more known parameters or one or more calculated parameters.

12. The system of claim 11, wherein the one or more known parameters comprise at least one of: known fuel composition or known fuel circuit effective area.

13. The system of claim 11, wherein the one or more calculated parameters comprise at least one of: a calculated downstream pressure or a calculated fuel temperature.

14. The system of claim 8, wherein determining a difference between the desired fuel flow and the actual fuel flow is based at least in part on a predefined deviation.

15. A method of detecting a fluid leak in a gas turbine engine, comprising:
positioning a pressure sensor in a fuel manifold;
adjusting a control valve to correspond with a desired fluid flow, wherein adjusting the control valve adjusts an actual fuel flow and a pressure in the fuel manifold downstream of the control valve;
determining the actual fluid flow downstream of the fuel manifold based at least in part on the pressure in the fluid manifold and one or more gas turbine engine parameters;
comparing the desired fluid flow with the actual fluid flow;
determining a difference between the desired fluid flow and the actual fluid flow, wherein the difference indicates a fluid leak; and
based at least in part on the difference, initiating at least one corrective action to mitigate a risk associated with the fluid leak.

16. The method of claim 15, wherein the at least one corrective action comprises at least one of: modifying one or more fuel circuit splits, modifying one or more operation conditions, or shutting down one or more fuel circuits.

* * * * *